(12) United States Patent
Rosenkrans et al.

(10) Patent No.: US 10,711,703 B2
(45) Date of Patent: Jul. 14, 2020

(54) FLUTTER SENSING AND CONTROL SYSTEM FOR A GAS TURBINE ENGINE

(71) Applicant: United Technologies Corporation, Farmington, CT (US)

(72) Inventors: William E. Rosenkrans, Columbia, CT (US); Robert J. Morris, Portland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 180 days.

(21) Appl. No.: 15/725,720

(22) Filed: Oct. 5, 2017

(65) Prior Publication Data

US 2018/0038285 A1 Feb. 8, 2018

Related U.S. Application Data

(63) Continuation of application No. 13/340,747, filed on Dec. 30, 2011, now abandoned, which is a
(Continued)

(51) Int. Cl.
*F02C 9/20* (2006.01)
*F01D 17/08* (2006.01)
*F01D 17/14* (2006.01)

(52) U.S. Cl.
CPC ............... *F02C 9/20* (2013.01); *F01D 17/08* (2013.01); *F01D 17/14* (2013.01); *F05D 2270/10* (2013.01)

(58) Field of Classification Search
CPC . F01D 17/08; F01D 17/14; F02C 9/20; F05D 2270/10
See application file for complete search history.

(56) References Cited

U.S. PATENT DOCUMENTS 2,258,792 A 4/1941 New
2,936,655 A 5/1960 Peterson et al.
(Continued)

FOREIGN PATENT DOCUMENTS

EP 0791383 8/1997
EP 1142850 10/2001
(Continued)

OTHER PUBLICATIONS

Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
(Continued)

*Primary Examiner* — Aaron R Eastman

(74) *Attorney, Agent, or Firm* — Carlson, Gaskey & Olds, P.C.

(57) ABSTRACT

A gas turbine engine includes a fan section that has a fan. A fan casing surrounds the fan section. A compressor section defines an engine axis. A gear train reduces a rotational speed of the fan relative to a shaft. A low pressure turbine is coupled to the shaft. A nacelle extends along the engine axis and surrounds the fan casing, a bypass ratio of greater than 10. A variable area fan nozzle defines a discharge airflow area. A flutter sensing system includes a controller programmed to move the variable area fan nozzle to vary the discharge airflow area in response to detecting an airfoil flutter condition associated with adjacent airfoils of the fan.

21 Claims, 4 Drawing Sheets

Related U.S. Application Data continuation of application No. 11/682,015, filed on Mar. 5, 2007, now abandoned.

(56) References Cited

U.S. PATENT DOCUMENTS

| | | | |
|---|---|---|---|
| 3,021,731 A | | 2/1962 | Stoeckicht |
| 3,194,487 A | | 7/1965 | Tyler et al. |
| 3,287,906 A | | 11/1966 | McCormick |
| 3,352,178 A | | 11/1967 | Lindgren et al. |
| 3,412,560 A | | 11/1968 | Gaubatz |
| 3,747,343 A | | 7/1973 | Rosen |
| 3,754,484 A | | 8/1973 | Roberts |
| 3,779,010 A | | 12/1973 | Chamay et al. |
| 3,792,584 A | * | 2/1974 | Klees ............... F02K 3/025 415/79 |
| 3,820,719 A | | 6/1974 | Clark |
| 3,854,286 A | * | 12/1974 | Klees ............... F02K 3/025 239/265.11 |
| 3,892,358 A | | 7/1975 | Gisslen |
| 3,932,058 A | | 1/1976 | Hamer et al. |
| 3,935,558 A | | 1/1976 | Miller et al. |
| 3,988,889 A | | 11/1976 | Chamay et al. |
| 4,043,121 A | * | 8/1977 | Thomas ............... F02K 3/075 415/78 |
| 4,052,845 A | * | 10/1977 | Tumavicus ............ F02K 3/075 137/625.44 |
| 4,068,469 A | | 1/1978 | Adamson |
| 4,080,785 A | * | 3/1978 | Koff ............... F02K 3/075 415/69 |
| 4,130,872 A | | 12/1978 | Harloff |
| 4,284,174 A | | 8/1981 | Salvana et al. |
| 4,478,551 A | | 10/1984 | Honeycutt, Jr. et al. |
| 4,649,114 A | | 3/1987 | Miltenburger et al. |
| 4,696,156 A | | 9/1987 | Burr et al. |
| 4,827,712 A | * | 5/1989 | Coplin ............... F02K 3/06 415/210.1 |
| 4,922,713 A | | 5/1990 | Barbarin et al. |
| 4,979,362 A | | 12/1990 | Vershure, Jr. |
| 5,005,353 A | | 4/1991 | Acton et al. |
| 5,102,379 A | | 4/1992 | Pagluica et al. |
| 5,141,400 A | | 8/1992 | Murphy et al. |
| 5,184,459 A | * | 2/1993 | McAndrews ......... F01D 17/162 415/149.2 |
| 5,317,877 A | | 6/1994 | Stuart |
| 5,433,674 A | | 7/1995 | Sheridan et al. |
| 5,447,411 A | | 9/1995 | Curley et al. |
| 5,466,198 A | | 11/1995 | McKibbin et al. |
| 5,478,199 A | | 12/1995 | Gliebe |
| 5,524,847 A | | 6/1996 | Brodell et al. |
| 5,655,360 A | | 8/1997 | Butler |
| 5,677,060 A | | 10/1997 | Terentieva et al. |
| 5,778,659 A | | 7/1998 | Duesler et al. |
| 5,857,836 A | | 1/1999 | Stickler et al. |
| 5,915,917 A | | 6/1999 | Eveker et al. |
| 5,975,841 A | | 11/1999 | Lindemuth et al. |
| 5,985,470 A | | 11/1999 | Spitsberg et al. |
| 6,004,095 A | * | 12/1999 | Waitz ............... B64C 21/025 415/119 |
| 6,195,982 B1 | | 3/2001 | Gysling et al. |
| 6,223,616 B1 | | 5/2001 | Sheridan |
| 6,315,815 B1 | | 11/2001 | Spadaccini et al. |
| 6,318,070 B1 | | 11/2001 | Rey et al. |
| 6,387,456 B1 | | 5/2002 | Eaton, Jr. et al. |
| 6,517,341 B1 | | 2/2003 | Brun et al. |
| 6,582,183 B2 | * | 6/2003 | Eveker ............... F04D 27/0207 415/1 |
| 6,607,165 B1 | | 8/2003 | Manteiga et al. |
| 6,709,492 B1 | | 3/2004 | Spadaccini et al. |
| 6,814,541 B2 | | 11/2004 | Evans et al. |
| 6,820,410 B2 | | 11/2004 | Lair |
| 6,983,588 B2 | | 1/2006 | Lair |
| 7,004,047 B2 | | 2/2006 | Rey et al. |
| 7,021,042 B2 | * | 4/2006 | Law ............... C23C 14/0623 384/913 |
| 7,328,580 B2 | | 2/2008 | Lee et al. |
| 7,340,883 B2 | | 3/2008 | Wood et al. |
| 7,374,403 B2 | | 5/2008 | Decker et al. |
| 7,591,754 B2 | | 9/2009 | Duong et al. |
| 7,644,575 B2 | | 1/2010 | Wood et al. |
| 7,662,059 B2 | | 2/2010 | McCune |
| 7,806,651 B2 | | 10/2010 | Kennepohl et al. |
| 7,824,305 B2 | | 11/2010 | Duong et al. |
| 7,926,260 B2 | | 4/2011 | Sheridan et al. |
| 7,997,868 B1 | | 8/2011 | Liang et al. |
| 8,205,432 B2 | | 6/2012 | Sheridan |
| 2002/0067988 A1 | | 6/2002 | Angelis |
| 2004/0128978 A1 | | 7/2004 | McCune et al. |
| 2004/0187476 A1 | | 9/2004 | Lair |
| 2005/0039437 A1 | | 2/2005 | Lair |
| 2005/0086927 A1 | | 4/2005 | Lair |
| 2008/0003096 A1 | | 1/2008 | Kohli et al. |
| 2008/0048398 A1 | | 2/2008 | Baird et al. |
| 2008/0092548 A1 | | 4/2008 | Morford et al. |
| 2008/0116009 A1 | | 5/2008 | Sheridan et al. |
| 2008/0163606 A1 | | 7/2008 | Cini et al. |
| 2008/0317588 A1 | | 12/2008 | Grabowski et al. |
| 2009/0056343 A1 | | 3/2009 | Suciu et al. |
| 2009/0067993 A1 | | 3/2009 | Roberge et al. |
| 2009/0090182 A1 | | 4/2009 | Holmquist |
| 2009/0193789 A1 | | 8/2009 | Pero |
| 2009/0208328 A1 | | 8/2009 | Stern |
| 2009/0226303 A1 | | 9/2009 | Grabowski et al. |
| 2009/0245997 A1 | | 10/2009 | Hurwitz et al. |
| 2009/0288386 A1 | | 11/2009 | Marshall et al. |
| 2009/0320488 A1 | | 12/2009 | Gilson et al. |
| 2010/0003121 A1 | * | 1/2010 | Berryann ............... F02K 1/12 415/1 |
| 2010/0005777 A1 | | 1/2010 | Marshall |
| 2010/0043393 A1 | | 2/2010 | Zamora et al. |
| 2010/0064659 A1 | | 3/2010 | Wang |
| 2010/0068039 A1 | * | 3/2010 | Winter ............... F02K 1/30 415/145 |
| 2010/0105516 A1 | | 4/2010 | Sheridan et al. |
| 2010/0148396 A1 | | 6/2010 | Xie et al. |
| 2010/0212281 A1 | | 8/2010 | Sheridan |
| 2010/0218483 A1 | | 9/2010 | Smith |
| 2010/0331139 A1 | | 12/2010 | McCune |
| 2011/0159797 A1 | | 6/2011 | Beltman et al. |
| 2011/0293423 A1 | | 12/2011 | Bunker et al. |
| 2012/0124964 A1 | | 5/2012 | Hasel et al. |

FOREIGN PATENT DOCUMENTS

| | | |
|---|---|---|
| GB | 1516041 | 6/1978 |
| GB | 2041090 | 9/1980 |
| GB | 2426792 | 12/2006 |
| WO | 2007038674 | 4/2007 |

OTHER PUBLICATIONS

Middleton, P. (1971). 614: VFW's jet feederliner. Flight International, Nov. 4, 1971. p. 725, 729-732.

Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-31.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.

Baker, R.W. (2000). Membrane technology and applications. New York, NY: McGraw-Hill. pp. 87-153.

Cheryan, M. (1998). Ultrafiltration and microfiltration handbook. Lancaster, PA: Tecnomic Publishing Company, Inc. pp. 171-236.

Seader, J.D. and Henley, E.J. (1998). Separation process principles. New York, NY: John Wiley & Sons, Inc. pp. 722-6 and 764-71.

(56) References Cited

OTHER PUBLICATIONS

Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.N. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Mccune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report Prepared for NASA. NASA CR-165608. pp. 1-178.
Whitaker, R. (1982). ALF 502: plugging the turbofan gap. Flight International, p. 237-241, Jan. 30, 1982.
Munt, R. (1981). Aircraft technology assessment: Progress in low emissions engine. Technical Report. May 1981. pp. 1-171.
Avco Lycoming Divison. ALF 502L Maintenance Manual. Apr. 1981. pp. 1-118.
Type Certificate Data Sheet No. E6NE. Department of Transportation Federal Aviation Administration. Jun. 1, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
San-et TFE731 Turbofan Engine (CAT C). Chapter 79: Lubrciation System. TTFE731 Issue 2. 2010. pp. 1-24.
Mccardle, J.G. (1979). Static test-stand performance of the YF-102 turbofan engine with several exhaust configurations for the quiet short-haul research aircraft (QSRA). Nasa Technical Paper. Nov. 1979. pp. 1-68.
Extended EP Search Report for Application No. EP 08 25 0728, dated Dec. 6, 2011.
Mcmillian, A. (2008) Material development for fan blade containment casing. Abstract. p. 1. Conference on Engineering and Physics:

(56) References Cited

OTHER PUBLICATIONS

Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K, Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Final Written Decision. U.S. Pat. No. 8,313,280. *General Electric Company*, Petitioner, v. *United Technologies Corporation*, Patent Owner. IPR2017-00427. Entered Jul. 3, 2018.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Kurzke, J. (2008). Preliminary Design, Aero-engine design: From state of the art turbofans towards innovative architectures. pp. 1-72.

Zamboni, G. and Xu, L. (2009). Fan root aerodynamics for large bypass gas turbine engines: Influence on the engine performance

(56) References Cited

OTHER PUBLICATIONS and 3D design. Proceedings of ASME Turbo Expo 2009: Power for Land, Sea and Air. Jun. 3-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 50-62, 85-87, 95-104, 121-123, 223-234, 242-245, 278-280, 303-309, 323-326, 462-479, 517-520, 563-565, 673-675, 582-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., Macmartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.

Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28 (9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on Sic fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76 (1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D.E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L, Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.

\* cited by examiner

FLUTTER SENSING AND CONTROL SYSTEM FOR A GAS TURBINE ENGINE

CROSS-REFERENCE TO RELATED APPLICATIONS

This application is a continuation of U.S. patent application Ser. No. 13/340,747, filed 30 Dec. 2011, which is a continuation of U.S. patent application Ser. No. 11/682,015, which was filed on 5 Mar. 2007 and is incorporated herein by reference.

BACKGROUND

This invention generally relates to a gas turbine engine, and more particularly to a flutter sensing system for a gas turbine engine.

Gas turbine engines typically include a compressor section, a combustor section and a turbine section. Air is pressurized in the compressor section and is mixed with fuel and burned in the combustor section to add energy to expand the air and accelerate the airflow into the turbine section. The hot combustion gases that exit the combustor section flow downstream through the turbine section, which extracts kinetic energy from the expanding gases and converts the energy into shaft horsepower to drive the compressor section.

In a turbofan gas turbine engine, for example, a fan section is included upstream of the compressor section. Combustion gases are discharged from the gas turbine engine through a core exhaust nozzle and fan air is discharged through an annular fan exhaust nozzle defined at least partially by a nacelle surrounding the core engine. A majority of propulsion thrust is provided by the pressurized fan air which is discharged through the fan exhaust nozzle, while the remaining thrust is provided from combustion gases discharged through the core exhaust nozzle.

A fan section, the compressor section and the turbine section may include multiple airfoils disposed circumferentially about an engine longitudinal centerline axis. At certain aircraft operating conditions, these airfoils may be subjected to flutter, or self-induced oscillations. The flutter conditions are caused by the interaction between adjacent airfoils. During flutter, aerodynamic forces couple with each airfoil's elastic and inertial forces, which may increase the kinetic energy of each airfoil and produce negative damping. The negative damping is enhanced where adjacent airfoils vibrate in unison. Disadvantageously, the airfoil oscillations caused by flutter may become so severe that fracture or failure of the airfoils is possible.

Methods are known for mitigating the negative effects of flutter. For example, many gas turbine engine systems include high pressure compressors having variable vane rows (i.e., vanes that are rotatable about a perpendicular axis relative to a longitudinal centerline axis of the gas turbine engine). The variable vane rows have been used effectively to schedule the engine around flutter conditions by controlling the angle of incidence of the airfoils relative to a direction of flowing airflow. Also, bleed or valve systems are known which bleed airflow downstream from the airfoils to throttle airflow and mitigate flutter. Additionally, airfoil designs are known which tailor a leading edge of each airfoil to obtain improved local airfoil incidence and adjacent airfoils having different natural frequencies. Finally, having inconsistent airfoil spacing in a forward stage varies the intermittent air pulses communicated to a following airfoil stage, thus reducing natural frequency excitation. Disadvantageously, all of these methods result in system compromises, small to moderate performance losses and may be expensive to incorporate into existing gas turbine engine systems.

Accordingly, it is desirable to provide a gas turbine engine having a closed-loop flutter sensing system which achieves reduced flutter operation and minimizes performance losses of the gas turbine engine.

SUMMARY

A gas turbine engine assembly according to an exemplary embodiment of the present disclosure includes, among other things, a nacelle, a core engine casing within the nacelle, a low pressure turbine having a pressure ratio that is greater than five, and a bypass passage established between the nacelle and the core engine casing. About 80% or more of airflow entering the engine is moved through the bypass passage.

In a further non-limiting embodiment of the foregoing gas turbine engine embodiment, about 80% of the airflow entering the engine is moved through the bypass passage.

In a further non-limiting embodiment of either of the foregoing gas turbine engine embodiments, the gas turbine engine includes a fan and a gear train, the gear train reduces the rotational speed of the fan relative to a shaft of the gas turbine engine. The shaft is rotatably coupled to a low pressure compressor of the engine.

In a further non-limiting embodiment of any of the foregoing gas turbine engine embodiments, the gear train is a planetary gear train.

In a further non-limiting embodiment of any of the foregoing gas turbine engine embodiments, a variable area fan nozzle controls a discharge airflow area of the bypass passage.

In a further non-limiting embodiment of any of the foregoing gas turbine engine embodiments, the discharge airflow area extends between the variable area fan nozzle and the core engine casing.

In a further non-limiting embodiment of any of the foregoing gas turbine engine embodiments, a controller is operable to move the variable area fan nozzle to change the discharge airflow area associated with the variable area fan nozzle in response to an airfoil flutter condition.

In a further non-limiting embodiment of any of the foregoing gas turbine engine embodiments, the controller influences the discharge airflow area by moving the variable area fan nozzle between a first position having a first discharge airflow area and a second position having a second discharge airflow area greater than the first discharge airflow area in response to the airfoil flutter condition.

A gas turbine engine according to another exemplary embodiment of the present disclosure includes, among other things, a nacelle, a core engine casing within the nacelle, a low pressure turbine having a pressure ratio that is greater than five, and a bypass passage established between the nacelle and the core engine casing. A ratio of an amount of airflow communicated through the bypass passage to an amount of airflow communicated through the core engine is greater than 10.

In a further non-limiting embodiment of the foregoing gas turbine engine embodiment, the gas turbine engine includes a fan and a gear train. The gear train reduces the rotational speed of the fan relative to a shaft of the gas turbine engine. The shaft is rotatably coupled to a low pressure compressor of the engine.

In a further non-limiting embodiment of either of the foregoing gas turbine engine embodiments, the gear train is a planetary gear train.

In a further non-limiting embodiment of any of the foregoing gas turbine engine embodiments, a variable area fan nozzle that controls a discharge airflow area of the bypass passage.

In a further non-limiting embodiment of any of the foregoing gas turbine engine embodiments, the discharge airflow area extends between the variable area fan nozzle and a core engine casing.

In a further non-limiting embodiment of any of the foregoing gas turbine engine embodiments, a controller is operable to move the variable area fan nozzle to change the discharge airflow area associated with the variable area fan nozzle in response to the airfoil flutter condition.

In a further non-limiting embodiment of any of the foregoing gas turbine engine embodiments, the controller influences the discharge airflow area by moving the variable area fan nozzle between a first position having a first discharge airflow area and a second position having a second discharge airflow area greater than the first discharge airflow area in response to detection of the airfoil flutter condition.

The various features and advantages of this invention will become apparent to those skilled in the art from the following detailed description. The drawings that accompany the detailed description are briefly described below.

DETAILED DESCRIPTION

Figure 1:
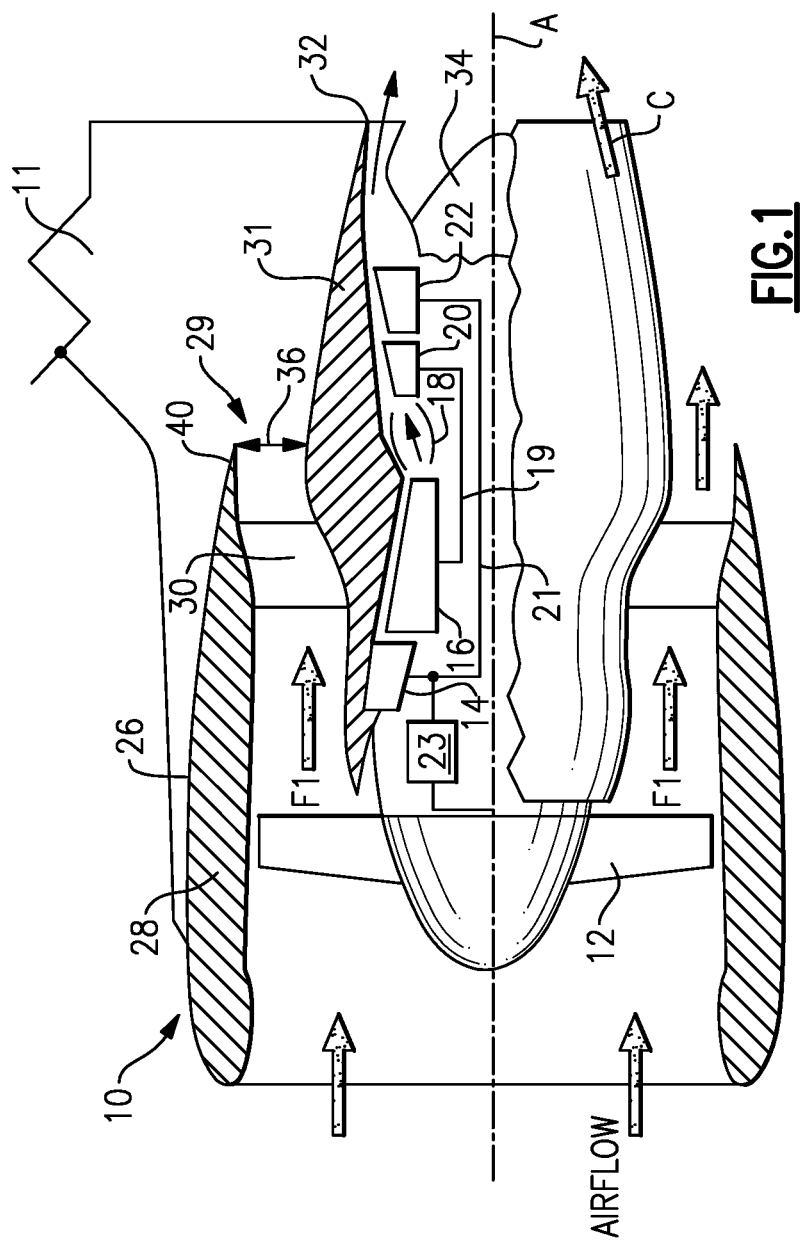
FIG. 1 illustrates a general partial cut-away view of a gas turbine engine.

FIG. 1 illustrates a gas turbine engine 10 which suspends from a pylon 11 and may include (in serial flow communication) a fan section 12, a low pressure compressor 14, a high pressure compressor 16, a combustor 18, a high pressure turbine 20 and a low pressure turbine 22. During operation, air is pulled into the gas turbine engine 10 by the fan section 12, is pressurized by the compressors 14, 16, and is mixed with fuel and burned in the combustor 18. Hot combustion gases generated within the combustor 18 flow through the high and low pressure turbines 20, 22, which extract energy from the hot combustion gases.

In a two spool design, the high pressure turbine 20 utilizes the extracted energy from the hot combustion gases to power the high pressure compressor 16 through a high speed shaft 19, and a low pressure turbine 22 utilizes the energy extracted from the hot combustion gases to power the low pressure compressor 14 and the fan section 12 through a low speed shaft 21. However, the invention is not limited to the two spool gas turbine architecture described and may be used with other architectures such as a single spool axial design, a three spool axial design and other architectures. That is, the present invention is applicable to any gas turbine engine, and to any application.

The example gas turbine engine 10 is in the form of a high bypass ratio turbofan engine mounted within a nacelle 26, in which a significant amount of the air pressurized by the fan section 12 bypasses the core engine for the generation of propulsion thrust. The nacelle 26 partially surrounds a fan casing 28 and an engine casing 31. The example illustrated in FIG. 1 depicts a high bypass flow arrangement in which approximately 80% of the airflow entering the fan section 12 may bypass the core engine via a fan bypass passage 30 which extends between the nacelle 26 and the core engine casing 31 for receiving and communicating a discharge airflow F1. The high bypass flow arrangement provides a significant amount of thrust for powering an aircraft.

In one example, the bypass ratio (i.e., the ratio between the amount of airflow communicated through the fan bypass passage 30 relative to the amount of airflow communicated through the core engine itself) is greater than ten, and the fan section 12 diameter is substantially larger than the diameter of the low pressure compressor 14. The low pressure turbine 22 has a pressure ratio that is greater than five, in one example. The engine 10 may include a gear train 23 which reduces the speed of the rotating fan section 12. The gear train 23 can be any known gear system, such as a planetary gear system with orbiting planet gears, a planetary system with non-orbiting planet gears, or other type of gear system. In the disclosed example, the gear train 23 has a constant gear ratio. It should be understood, however, that the above parameters are only exemplary of a contemplated geared turbofan engine. That is, the invention is applicable to a traditional turbofan engine as well as other engine architectures.

The discharge airflow F1 is communicated within the fan bypass passage 30 and is discharged from the engine 10 through a variable area fan nozzle (VAFN) 40 defined radially between the nacelle 26 and the core engine casing 31. Core exhaust gases C are discharged from the core engine through a core exhaust nozzle 32 defined between the core engine casing 31 and a center plug 34 defined coaxially therein around a longitudinal centerline axis A of the gas turbine engine 10.

In one example, the VAFN 40 concentrically surrounds the core engine casing 31 near an aftmost segment 29 of the nacelle 26. However, the VAFN 40 may be positioned at other locations of the engine 10. A discharge airflow area 36 is associated with the VAFN 40 and extends between the VAFN 40 and the core engine casing 31 for axially discharging the fan discharge airflow F1.

Figure 2:
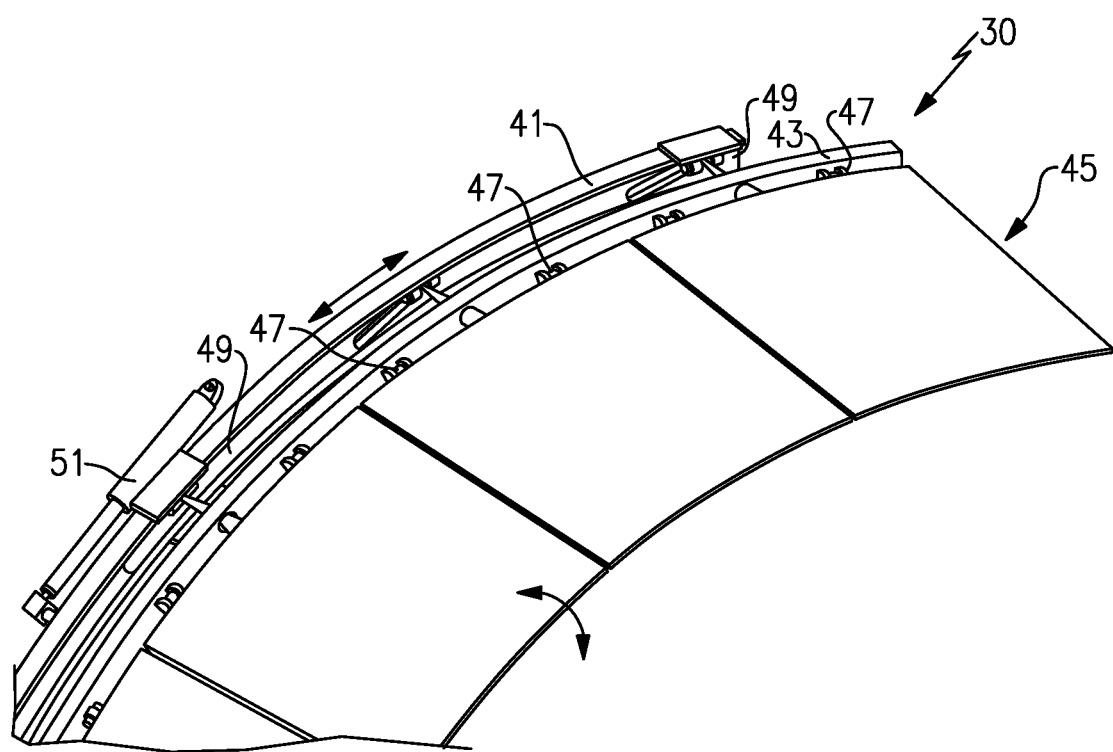
FIG. 2 is a perspective view of a section of a variable area fan nozzle (VAFN)

FIG. 2 illustrates the components of the VAFN 40. This structure is exemplary only, and, as other embodiments would similarly vary the discharge airflow area 36, will only be briefly discussed herein. The VAFN 40 generally includes a synchronizing ring 41, a static ring 43 and at least one flap assembly 45. Other VAFN actuation mechanisms may be used. The flap assembly 45 is pivotally mounted to the static ring 43 at multiple hinges 47 and linked to the synchronizing ring 41 through a linkage 49. An actuator assembly 51 selectively rotates the synchronizing ring 41 relative to the static ring 43 to adjust the flap assembly 45 through the linkage 49. The radial movement of the synchronizing ring 41 is converted to tangential movement of the flap assembly 45 to vary the discharge airflow area 36 of the VAFN 40, as is further discussed below.

Figure 3:
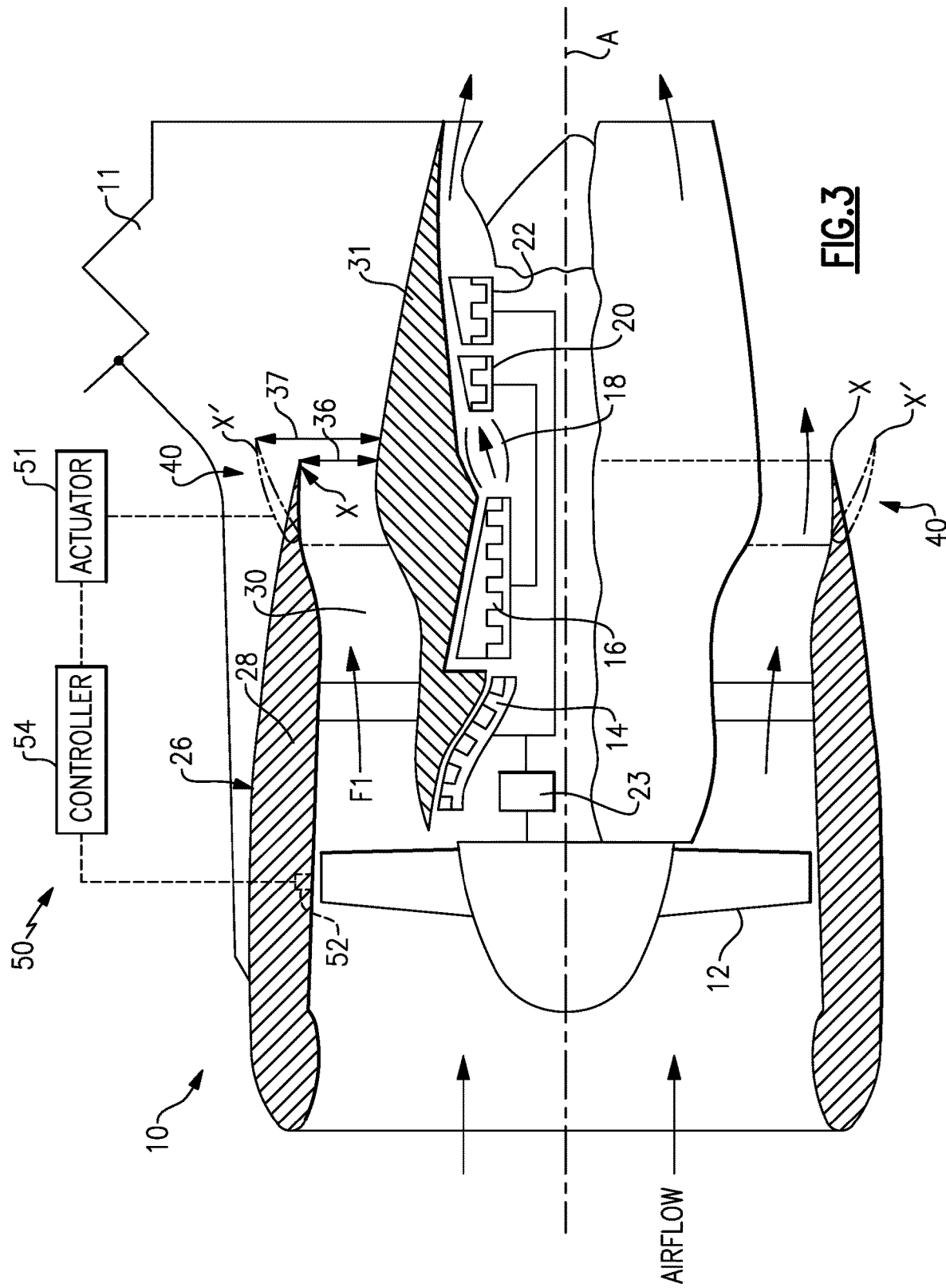
FIG. 3 is a schematic view of an example gas turbine engine having a variable area fan nozzle (VAFN)

FIG. 3 illustrates a flutter sensing system 50 of the gas turbine engine 10. The discharge airflow area 36 may be influenced during certain flight conditions, such as flutter conditions, by opening or closing the VAFN 40. Flutter conditions represent self-induced oscillations. Flutter conditions are caused by unsteady aerodynamic conditions such as the interaction between adjacent airfoils. During flutter, aerodynamic forces couple with each airfoil's elastic and inertial forces, which may increase the kinetic energy of each airfoil and produce negative damping. The negative damping is enhanced where adjacent airfoils begin to vibrate together.

In one example, the VAFN 40 is moveable between a first position X and a second position X' (represented by phantom lines). A discharge airflow area 37 of the second position X' is greater than the discharge airflow area 36 of the first position X.

The VAFN 40 is selectively moved to the second position X' to control the air pressure of the discharge airflow F1 within the fan bypass passage 30. For example, closing the VAFN 40 (i.e., moving the VAFN to the first position X) reduces the discharge airflow area which restricts the fan airflow F1 and produces a pressure build up (i.e., an increase in air pressure) within the fan bypass passage 30. Opening the VAFN 40 to the second position X' increases the discharge airflow area, allowing additional fan airflow, which reduces the pressure build up (i.e., a decrease in air pressure) within the fan bypass passage 30. That is, opening the VAFN 40 creates additional thrust power for the gas turbine engine 10.

The flap assemblies 45 (See FIG. 2) of the VAFN 40 are moved from the first position X to the second position X' in response to detecting a flutter condition of the gas turbine engine 10, in one example. In another example, the VAFN 40 is moved in response to detecting a cross-wind condition. However, it should be understood that the VAFN 40 may additionally be actuated in response to other operability conditions such as take-off or ground operations.

The flutter sensing system 50 is a closed-loop system and includes a sensor 52 and a controller 54. The sensor 52 actively and selectively detects the flutter condition and communicates with the controller 54 to move the VAFN 40 between the first condition X and the second position X' or any intermediate position via the actuator assemblies 51. Of course, this view is highly schematic. In one example, the sensor 52 is a time of arrival type sensor. A time of arrival sensor times the passage (or arrival time) of an airfoil as the airfoil passes a fixed, case-mounted sensor as the airfoil rotates about the engine longitudinal centerline axis A. In the example shown in FIG. 3, the arrival time of the fan section 12 airfoils 60 are timed by the sensor 52. Of course, other airfoils may similarly be timed. The controller 54 is programmed to differentiate between which airfoil arrival times correlate to a flutter condition and which airfoil arrival times correlate to non-flutter conditions.

It should be understood that the sensor 52 and the controller 54 are programmable to detect flutter conditions or other conditions. A person of ordinary skill in the art having the benefit of the teachings herein would be able to select an appropriate sensor 52 and program the controller 54 with the appropriate logic to communicate with the sensor 52 and the actuator assembly 51 to move the VAFN 40 between the first position X and the second position X' or any intermediate position in response to a flutter condition or any other condition.

The VAFN 40 is returned to the first position X from the second position X', which is otherwise indicated when the flutter conditions subside. In one example, the sensor 52 communicates a signal to the controller 54 where the flutter conditions are no longer detected by the sensor 52. Therefore, the efficiency of the gas turbine engine 10 is improved during both flutter and non-flutter conditions. Also, airfoil damage due to continued operation in a flutter condition is reduced.

Figure 4:
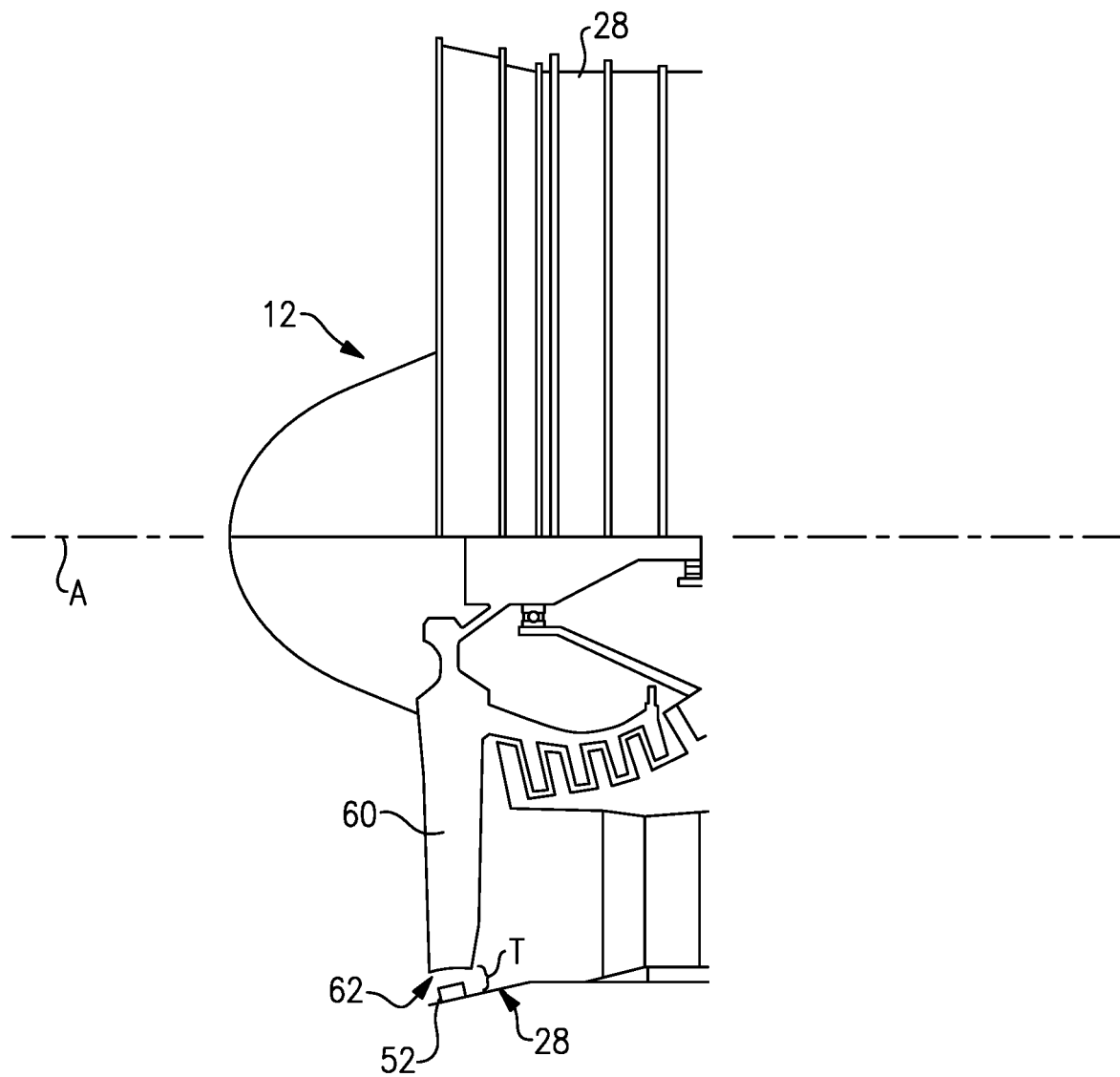
FIG. 4 illustrates a partial cut-away view of a fan section of the gas turbine engine.

FIG. 4 illustrates an example mounting location for the sensor 52 of the flutter sensing system 50. In one example, the sensor 52 is mounted to the fan casing 28 which surrounds the fan section 12. In another example, the sensor 52 is mounted directly adjacent to a blade tip area T of the fan section 12. The blade tip area T of the fan section 12 is the area of the fan casing 28 which is directly adjacent to the tips 62 of each airfoil 60 (only one shown in FIG. 4) of the fan section 12 as the airfoils 60 are rotated about the engine centerline axis A. In yet another example, multiple sensors 52 are circumferentially disposed about the core engine casing 31 adjacent to the blade tip area T of each airfoil 60. The sensor 52 may also be mounted adjacent to the blade tip area of the airfoils of the compressor sections 14, 16 or the turbine sections 20, 22.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

What is claimed is:

1. A gas turbine engine comprising:
   a fan section including a fan;
   a fan casing surrounding the fan section;
   a compressor section defining an engine axis;
   a gear train that reduces a rotational speed of the fan relative to a shaft;
   a low pressure turbine coupled to the shaft;
   a nacelle extending along the engine axis and surrounding the fan casing;
   a bypass ratio of greater than 10;
   a variable area fan nozzle defining a discharge airflow area; and
   a flutter sensing system including a controller programmed to move the variable area fan nozzle to vary the discharge airflow area in response to detecting an airfoil flutter condition associated with adjacent airfoils of the fan;
   wherein the discharge airflow area extends between the variable area fan nozzle and a core engine casing that surrounds the compressor section;
   wherein the flutter sensing system includes a sensor in communication with the controller, and the controller is programmed to move the variable area fan nozzle between a first position having a discharge airflow area and a second position having a second discharge airflow area greater than the first discharge airflow area in response to the airfoil flutter condition;
   wherein the sensor detects the airfoil flutter condition;
   wherein the sensor detects a time of arrival of the adjacent airfoils, and the controller is programmed to differentiate between airfoil arrival times of the adjacent airfoils that correlate to flutter conditions and other airfoil arrival times of the adjacent airfoils that correlate to non-flutter conditions;
   wherein the second position is radially outward from the first position relative to the engine axis; and
   wherein the variable area fan nozzle includes a synchronizing ring, a static ring and at least one flap assembly, the at least one flap assembly pivotally mounted to the static ring and linked to the synchronizing ring.

2. The gas turbine engine as recited in claim 1, wherein the sensor is mounted adjacent to a blade tip area defined by the adjacent airfoils.

3. The gas turbine engine as recited in claim 2, wherein the sensor is mounted to the fan casing, and the blade tip area is defined as an area of the fan casing directly adjacent to tips of the adjacent airfoils.

4. The gas turbine engine as recited in claim 1, wherein the sensor is a plurality of sensors circumferentially disposed about the core engine casing.

5. The gas turbine engine as recited in claim 1, wherein the engine is a two spool engine comprising a low spool and a high spool, the compressor section including a low pressure compressor and a high pressure compressor, the low spool including the low pressure compressor driven by the low pressure turbine, the low pressure compressor including a plurality of stages, the low pressure turbine being a three-stage turbine, the high spool including a two-stage high pressure turbine that drives the high pressure compressor, and the gear train has a constant gear ratio.

6. A gas turbine engine comprising:
a fan section including a fan;
a fan casing surrounding the fan section;
a compressor section and a turbine section extending along an engine axis, the turbine section including a high pressure turbine and a low pressure turbine that drives a shaft;
a gear train interconnecting the fan and the shaft;
a nacelle surrounding the fan casing;
a variable area fan nozzle axially aft of the fan casing relative to the engine axis, the variable area fan nozzle moveable relative to the engine axis to influence a discharge airflow area associated with the variable area fan nozzle;
an actuator assembly that moves the variable area fan nozzle between a first position and a second position relative to the engine axis; and
a flutter sensing system including a sensor and a controller programmed to communicate with the actuator assembly to move the variable area fan nozzle to vary the discharge airflow area in response to the sensor detecting an airfoil flutter condition.

7. The gas turbine engine assembly of claim 6, wherein the shaft is rotatably coupled to a low pressure compressor having a plurality of stages, and the low pressure turbine is a three-stage turbine.

8. The gas turbine engine as recited in claim 7, further comprising a bypass ratio of greater than 10, and wherein the second position is radially outward from the first position relative to the engine axis.

9. The gas turbine engine as recited in claim 6, wherein the sensor is a plurality of sensors circumferentially disposed about a core engine casing, each of the plurality of sensors being a time of arrival type sensor.

10. The gas turbine engine as recited in claim 6, further comprising a bypass ratio of greater than 10, and wherein the first position defines a first discharge airflow area and the second position defines a second discharge airflow area greater than the first discharge airflow area.

11. The gas turbine engine as recited in claim 6, wherein the sensor is mounted adjacent to a blade tip area defined by adjacent airfoils.

12. The gas turbine engine as recited in claim 11, wherein the sensor is coaxially aligned with the blade tip area with respect to the engine axis.

13. The gas turbine engine assembly of claim 11, wherein the discharge airflow area extends between the variable area fan nozzle and a core engine casing.

14. The gas turbine engine as recited in claim 13, further comprising a bypass ratio of greater than 10, and wherein the blade tip area is defined between the fan casing and the adjacent airfoils.

15. The gas turbine engine as recited in claim 14, wherein the second position is radially outward from the first position with respect to the engine axis, the actuator assembly includes a synchronizing ring, a static ring and a plurality of flap assemblies extending about the engine axis, the plurality of flap assemblies pivotally mounted to the static ring and linked to the synchronizing ring, and the controller is programmed to communicate with the actuator assembly to rotate the synchronization ring relative to the static ring to adjust the plurality of flap assemblies and vary the discharge airflow area in response to the sensor detecting the airfoil flutter condition.

16. The gas turbine engine as recited in claim 15, wherein the sensor detects a time of arrival of the adjacent airfoils, and the controller is programmed to differentiate between airfoil arrival times of the adjacent airfoils that correlate to flutter conditions and other airfoil arrival times of the adjacent airfoils that correlate to non-flutter conditions.

17. The gas turbine engine as recited in claim 16, wherein the sensor is a plurality of sensors circumferentially disposed about the core engine casing.

18. The gas turbine engine as recited in claim 17, wherein the gear system is a planetary gear system with orbiting planet gears.

19. The gas turbine engine as recited in claim 14, wherein the sensor detects a time of arrival of the adjacent airfoils, and the controller is programmed to differentiate between airfoil arrival times of the adjacent airfoils that correlate to flutter conditions and other airfoil arrival times of the adjacent airfoils that correlate to non-flutter conditions.

20. The gas turbine engine as recited in claim 19, wherein the high pressure turbine is a two-stage turbine.

21. The gas turbine engine as recited in claim 11, wherein the adjacent airfoils are located in the compressor section or the turbine section.

* * * * *